US005724404A

United States Patent [19]
Garcia et al.

[11] Patent Number: 5,724,404
[45] Date of Patent: Mar. 3, 1998

[54] INTEGRATED INTERNATIONAL TELEPHONE CIRCUIT MONITORING SYSTEM

[76] Inventors: Max Garcia, 1418 Grant St., Hollywood, Fla. 33020; Ben Holzemer, 19601 E. Country Club Dr., #107, Aventura, Fla. 33180; David Butler, 14560 NE. 3 Ct., North Miami, Fla. 33161; Kevin Collins, 600 S. Dixie Hwy., Ste. 206, Boca Raton, Fla. 33432

[21] Appl. No.: 498,665

[22] Filed: Jul. 3, 1995

[51] Int. Cl.[6] ............................ H04M 3/22; H04M 15/00; H04M 3/00
[52] U.S. Cl. ...................... 379/34; 379/133; 379/196; 379/207
[58] Field of Search ...................... 379/34, 111, 112, 379/113, 114, 133, 134, 188, 189, 196, 197, 198, 201, 202, 207

[56] References Cited

U.S. PATENT DOCUMENTS

| | | | |
|---|---|---|---|
| 5,187,740 | 2/1993 | Swaim | 379/201 |
| 5,425,084 | 6/1995 | Brinskele | 379/114 |
| 5,463,681 | 10/1995 | Vaios | 379/189 |
| 5,467,388 | 11/1995 | Redd, Jr. | 379/196 |
| 5,504,810 | 4/1996 | McNair | 379/189 |
| 5,566,234 | 10/1996 | Reed | 379/188 |
| 5,579,382 | 11/1996 | Tsukishima | 379/201 |

OTHER PUBLICATIONS

"The Privateers" The Economist, Sep. 92, p. 29, 329/201.
"Rome to Bonn Via New Jersey" Business Week, Apr. 92, pp. 84–85.

Primary Examiner—Curtis Kuntz
Assistant Examiner—Vijay Shankar
Attorney, Agent, or Firm—Malloy & Malloy, P.A.

[57] ABSTRACT

An integrated international telephone circuit monitoring system to restrict and substantially prevent abusive types of international telephone call reorigination, the system including a circuit monitoring card to monitor international telephone circuits from a reorigination country and thereby detect DTMF tones associated with telephone call reorigination and transmitted over the international circuit, and/or a second dial tone associated with the initiation of an international reorigination call, on a connection completed call, for subsequent blocking. Additionally, the telephone circuit monitoring card is structured to detect questionable DTMF tone dialing patterns associated with telephone call reorigination for subsequent blocking of completed transmission of the DTMF tone codes. Further, the present system is structured to collect data, from a gateway switch in the user's country, relating to international calls to the reorigination country which are never answered, for determination that the telephone number being called is actually a DID access telephone number utilized to initiate a call-back for reorigination of a long-distance call, and for subsequent repeated confirmation calling of a number classified as a detected DID access telephone number, because a predetermined of unanswered calls have been placed to it, to verify that the number is a DID access number.

46 Claims, 1 Drawing Sheet

INTEGRATED INTERNATIONAL TELEPHONE CIRCUIT MONITORING SYSTEM

BACKGROUND OF THE INVENTION

1. Field of the Invention

The present invention relates to an integrated international telephone circuit monitoring system to be utilized to restrict and substantially prevent abusive types of international long-distance telephone call reorigination, thereby ensuring that a foreign, generally state owned telephone company (PTT) can maintain the effectiveness and integrity of their long-distance communication systems.

2. Description of the Related Art

International Call-Back and other methods of telephone call reorigination are increasingly becoming lucrative and profitable businesses for entrepreneurs in countries with advanced international telecommunication systems, and especially the United States. In particular, countries such as the United States have such heavy competition and are so advanced with regard to long distance and international telecommunications services, that the cost of an international long distance call originating from that country is considerably less than if it is originated in another country throughout the world. This is especially the case in central and south american countries where the telephone systems are much less advanced and are often state run.

In order to take advantage of the pricing discrepancies, international telephone call reorigination primarily involves customers in a given foreign country who wish to make a long-distance telephone call to another foreign country, but rather than dialing directly and utilizing the foreign PTT's expensive service, they will trigger reorigination from a hub in a reoriginating country. This reorigination generally involves two out-bound calls from the reorigination country, one being placed to the caller and one being placed to the destination party being called, for a linked connection through switching facilities in the reorigination country. In these circumstances, although multiple telephone calls are being placed from the reorigination country, the cost to the consumer turns out to be less than had they made a direct call utilizing their own more expensive foreign PTT services. Also, not only do these reorigination methods cut out the foreign PTT, but they also will use the foreign PTT and a corresponding carrier's services in an abusive manner by initiating or triggering the call reorigination using the PTT's service, thus tying up the foreign PTT's circuits and causing the foreign PTT to incur the connection expenses, but not paying the foreign PTT for these uses because no long distance connection was actually made.

Further, a major factor in long distance fee negotiation between the PTT's of various different countries relates to the telephone call volume. For example, a country such as the U.S. must generally pay a fee to the foreign PTT based upon the volume and nature of the international use. When reorigination is implemented, however, the call is improperly allocated resulting in incorrect accounting.

International telephone call reorigination is especially common with U.S. based providers. In particular, because of the advanced U.S. communication technology and especially because of the nature of the U.S. free market/ competitive telecommunications systems, operators who wish to set up a reorigination network are able to buy up substantial chunks of international air time, at considerably reduced rates, for resale to their foreign customers.

Further, foreign PTT's are left with limited recourse against the U.S. or foreign based reorigination operators. For example, in the U.S., because of the nature of abuses that occur, U.S. carriers, who are often selling the air time to the reorigination operators, and the FCC, who wishes to promote free market dealings, will not seek to stop these U.S. based reoriginators. In fact, only recently has the FCC taken any action, but this action relates only to specific types of reorigination and reorigination directed to countries that have specifically been able to make certain types of reorigination illegal. As to direct action by the foreign PTTs, because the reoriginators are almost entirely based within the United States or the outside reorigination country, they are outside the sphere of influence of the foreign PTTs and no effective legal or regulatory action can be taken. As a result, the foreign PTTs must take steps to seek out affirmative and aggressive technological reorigination blocking and prevention methods if they are to have any hope of eliminating the abusive types of reorigination.

Through the development of the present invention, it has been recognized that there are three main, identified characteristics in the most prevalent types of abusive telephone call reorigination. These characteristics include: i) DTMF (Dual Tone Multi Frequency) dialing, ii) DID (Direct Inward Dial) call requests and iii) the use of ITFS/800 numbers (International Toll Free Service) for reorigination.

The first two features are primarily associated with call-back type reorigination. In call-back type reorigination, a customer in a foreign country sets up an account with a reorigination operator and is given a specific U.S. DID access number, one of the identified characteristics. This DID access number is actually just a telephone number, generally in the reorigination country, which the customer calls when they would like to place an international telephone call. When the customer in the foreign country calls their DID access telephone number, the foreign PTT's international telephone circuits to the reorigination country are tied up, the foreign PTT's services are used at some expense to the foreign PTT, but nothing is billed or collected by the foreign PTT because the call placed to the DID access number will never be answered. The call to the DID access number is not answered, but it does initiate the reorigination by triggering an immediate call-back to that foreign customer from the reorigination country. As such, the foreign customer dials the international number, hangs up after a number of rings and waits to be called. Once they are called back and receive a U.S. or reorigination country dial tone, they are able to input the destination foreign telephone number which they wish to call for subsequent connection. This inputting of the international telephone number is usually performed by way of DTMF or "touch tone" dialing, another of the identified characteristics, wherein the customer uses the keys on their telephone to enter the international area code and telephone number with which they wish to be connected and/or a particular access code that identifies their billing account. Although tone dialing is the primary means of inputting the necessary information, primarily due to the relatively smaller expense to the reorigination provider, some reorigination companies also allow the destination number to be inputted via a voice recognition system or at a last resort by an actual operator, but these are less frequently used due to the substantially added expense involved in these methods. As soon as the international destination telephone number has been inputted by the customer, the reorigination call, which as been placed to the customer from the reorigination operator, is put on hold and a call to the destination telephone number is placed, also originated from the reorigination country. As soon as the outbound call is placed, both outbound telephone calls are linked with one another and the foreign consumer is able to speak with their destination party at a substantially less expensive cost than if they had dialed directly. In fact, despite some delays common to most reorigination systems, such as for placing the call-back and establishing the linkup, the savings achieved make those inconvenience minor. As to the reorigination companies, the combination of arbitraged, bulk-purchased international phone time, the wealth of simple and inexpensive switching technologies available, and the bulk purchase of U.S. based numbers for use as access code numbers makes the overall cost of doing business relatively inexpensive and allows for substantial profit margin to be achieved by the reorigination providers.

The other main type of telephone call reorigination, which is in fact often provided along with the DID access number reorigination by way of a calling card, involves use of an ITFS/800 number for reorigination. In this type of reorigination, the reorigination providers will purchase from the foreign PTT an international ITFS/800 number telephone line on the foreign PTT's telephone circuits, the third identified characteristic. These ITFS/800 number telephone lines are made available to international customers by the foreign PTT for legitimate business purposes, such as for communication with international companies having offices and/or consumers in various foreign countries, and are generally purchased for a relatively inexpensive rates. When a prospective reorigination provider purchases these lines, however, they will not inform the foreign PTT of their actual intended purpose and the heavy volume or "unauthorized refile" that will be present to circumvent the foreign PTT's international services. Once the ITFS/800 number telephone line is set up by the reorigination provider, foreign customers must merely make the toll-free call, input a pin code/access number and/or destination call number utilizing the DTMF tones, and wait to be connected with their destination party. In this type of reorigination, although the foreign PTT's service is being paid for, to some extent, through the purchase of the ITFS/800 number telephone line, the ITFS/800 number telephone line is not being utilized for its intended purpose and the foreign PTT is only collecting for a small fraction of the international long distance service which it is unknowingly providing. There are some U.S. carriers who perform legitimate, authorized ITFS/800 number telephone call reorigination. These authorized carriers take steps to negotiate specific deals with the foreign PTTs based on honest accounts of the usage so as to provide their customer with reorigination services and appropriately compensate the foreign PTTs. Still, the profit potential of unauthorized reorigination is so great that various abusive reoriginators who do not need to maintain business relationships with the foreign PTTs enter the market.

Accordingly, foreign PTTs have sought to implement any available systems to block the reorigination calls. Known prevention systems, however, are not cost effective, efficient and/or able to sufficiently and discriminatingly prevent the reorigination. One prior art method of preventing the international telephone call reorigination simply involves a manual search of international telephone records by the foreign PTTs in an attempt to determine what numbers could potentially be DID access numbers. This prior art method, however, is substantially time consuming and unverifiable, and even if successful gives the reorigination operator substantial time to provide the customer with a new DID access number and a long period of further reorigination service before the foreign PTT's search finally determines what the new access number is.

Additionally, and more commonly, most foreign PTTs are turning to prevention systems that incorporate a form of DTMF tone filtering in an attempt to eliminate the reorigination. These types of systems operate by filtering out any tones which are detected after an international telephone call is made. These conventional systems, however, cannot properly and accurately distinguish between legitimate telephone calls and reorigination calls and often will disconnect legitimate international calls. Further, the existing systems, in an attempt to increase efficiency, generally rely upon correlation of an international call followed by an immediate call-back from the number being called. These systems, however, are easily circumvented by arranging for the call-back to be made from a number different from the DID access number that was called. Given the inaccuracies of the preceding systems, foreign PTTs, in their desperate attempt to find some method of preventing the reorigination, have turned to systems which listen for additional ring tones. In particular, these systems listen in on international calls and if a ringing tone is heard after the international call has been already connected, the international telephone call is immediately disconnected. Unfortunately, however, most common voice mail and multi-operator/multi-line telephone systems incorporate additional rings when merely transferring calls from one location to another, and as a result a very large number of legitimate international telephone calls end up being dropped, making this type of system substantially in effective.

As a result, there is a substantial need in the art for a international telephone circuit monitoring system and method which will effectively target all primary types of abusive international telephone call reorigination, will substantially eliminate the interruption or disconnection of legitimate international telephone calls, and will not hinder legitimate, authorized reorigination operators from effectively serving their customers.

SUMMARY OF THE INVENTION

The present invention is directed towards an integrated international telephone circuit monitoring system and method for restricting and substantially preventing abusive international long-distance telephone call reorigination. The system includes at least one circuit monitoring card disposed on and connected with an international telephone circuit from a reorigination country into a user's country. The circuit monitoring card is structured and disposed to monitor the international telephone circuits and detect the transmission of DTMF tones associated with telephone call reorigination over the international telephone circuit on a connection completed international call. Once a DTMF tone associated with telephone call reorigination is detected, blocking means selectively prevent completed transmittal of the DTMF tones associated with telephone call reorreorigination over the connection completed international call on the telephone circuit, thereby effectively preventing the reorigination customer from completely inputting their destination telephone number for subsequent connection.

Further, the system of the present invention includes DID access telephone number detection means. The DID access telephone number detection means is structured and disposed to determine that a telephone number in the reorigination country is actually a DID access telephone number that is being utilized to initiate an inbound call-back to a reorigination customer through which a long-distance call placed by the customer is reoriginated. In order to make the necessary determinations, the DID access telephone number detection means are connected at a gateway switch in the user's country so as to collect data from the gateway switch relating to international telephone calls directed to the reorigination country which are never answered. Once the DID access telephone number detection means recognize that a predetermined number of unanswered calls have been placed to a specific international telephone number, preferably in a known reorigination country, that international telephone number is classified by the DID access telephone number detection means as a detected DID access telephone number. Once a number is classified as a detected DID access telephone number, the present system utilizes its DID access telephone number verification means to call the detected DID access telephone number a predetermined number of times to continuously confirm that calls that are placed to the detected DID access number are never answered and that therefore the detected DID access number is actually a DID access number. The DID access number verification means are further structured to detect an answer to one of the calls to the detected DID access telephone number and unclassify that international telephone number as one of the detected DID access telephone numbers.

Also, so as to prevent ITFS/800 number reorigination, the telephone circuit monitoring card of the system of the present invention is structured to monitor calls made over the telephone circuits of the user country and thereby detect questionable DTMF tone dialing patterns initiated upon completed connection of an international call. Once detected, the blocking means will function to prevent completed transmission of DTMF tone codes having the questionable DTMF tone dialing pattern. Additionally, so as to prevent the blocking of legitimate calls and or authorized call reorigination, the telephone circuit monitoring card is further structured to exclude telephone numbers/lines corresponding authorized telephone call reoriginators and calling cards from being monitored thereby and being accordingly being attacked by the blocking means.

Finally, the present system includes data storage means structured to store data collected by the DID access telephone number detection means, data relating to the telephone lines whereon questionable DTMF tone dialing patterns initiated upon completed connection of the call have been detected, and data relating to the circuits upon which dropped calls are being made.

As such, the system of the present invention is incorporated as part of a method of restricting and substantially preventing abusive international long-distance telephone call reorigination which utilizes DTMF dialing, DID call requests, and/or the use of ITFS/800 numbers for reorigination. The method comprises an initial step of monitoring telephone circuits, and especially those circuits from a known reorigination country. Next, DTMF tones associated with telephone call reorigination transmitted over the telephone circuit on a connection completed international call are detected, and completed transmission thereof over the telephone circuits is blocked. Additionally, data from a gateway switch in a user's country that relates to international telephone calls placed to a reorigination country which are never answered is collected. Using this data, international telephone numbers in the reorigination country to which a predetermined number of unanswered calls have been made are classified as detected DID access telephone numbers. These detected DID access telephone numbers are then called a predetermined number of times to continuously confirm that calls placed to the detected DID access telephone number are never answered and therefore that the detected DID access telephone number is actually a DID telephone access number. Next, the telephone circuits are monitored to detect questionable DTMF tone dialing patterns initiated upon completed connection of the international call are detected. The completed transmission of DTMF tone codes having the detected questionable DTMF tone dialing patterns are then blocked to prevent the unauthorized reorigination. Finally, the international telephone circuits are monitored to listen for a second dial tone used to prompt a reorigination user to input their destination number and/or access code.

It is an object of the present invention to provide an integrated internal telephone circuit monitoring system which will effectively and systematically monitor and substantially prevent abusive international long distance telephone call reorigination.

It is another object of the present invention to provide an integrated internal telephone circuit monitoring system capable of substantially accurately identifying DTMF tones relating to destination telephone number transmittal for call-back type international telephone call reorigination.

Still another object of the present invention is to provide an integrated international telephone circuit monitoring system structured to detect and identify a long-distance telephone call reorigination call-back, even if DTMF tones are not utilized for destination telephone number transmission.

An additional object of the present invention is to provide a monitoring system structured to ensure that distributed ITFS/800 number telephone lines are not improperly being utilized for telephone call reorigination purposes.

Also an object of the present invention is to provide a method of restricting and substantially preventing abusive international long-distance telephone call reorigination which systematically identifies and detects the primary characteristics generally associated with international telephone call reorigination.

Yet another object of the present invention is to provide an international telephone circuit monitoring system which will enable a user to restrict and substantially prevent abusive international long-distance telephone call reorigination which is reoriginated in a foreign country without having to rely upon the actions of the regulatory agencies in the respective reorigination country.

Also an object of the present invention is to provide an international telephone circuit monitoring system which will maintain a data base of results relating to telephone call reorigination which can be used in future service negotiation with international long distance service providers that are facilitating the reorigination.

BRIEF DESCRIPTION OF THE DRAWINGS

For a fuller understanding of the nature of the present invention, reference should be had to the detailed description taken in connection with the accompanying drawing in which.

DETAILED DESCRIPTION OF THE PREFERRED EMBODIMENT

Figure 1:
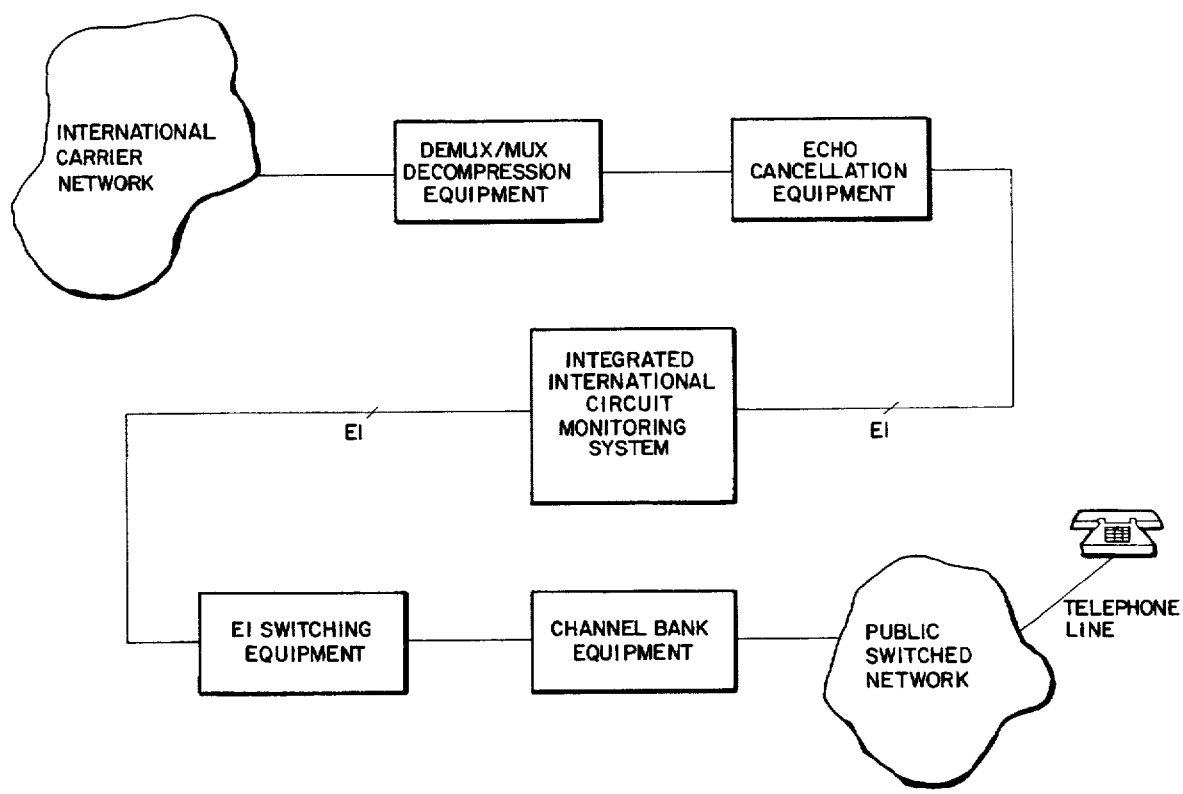
FIG. 1 is a schematic illustration of the preferred connection of the monitoring system of the present invention within a foreign PTT's international telephone system.

The present invention is directed towards an integrated international telephone circuit monitoring system which is to be utilized to restrict and substantially prevent abusive international long-distance teleparticular, theigination. In particular, the monitoring system will be primarily utilized by the local PTT of a user country so as to monitor international telephone circuits maintained with carriers in potential reorigination countries such as the U.S. in an effective manner to prevent the PTT from being abused by various methods of long-distance telephone call reorigination.

Included in the circuit monitoring system is at least one, but preferably a plurality of circuit monitoring card. Each of these circuit monitoring cards is disposed and preferably connected with at least one E-1 or international circuit bundle containing a number of international telephone circuits from a predetermined reorigination country into the user's country. Specifically, there are several types of E-1's that utilize substantially different signaling protocols, namely in band and out of band circuits. In band signaling circuits, although less sophisticated, are the more commonly used by foreign PTT's, as they have been in existence for some time and the costs of replacement or upgrading will generally not warrant a change. In these circuits with in band signaling, conventional signaling protocols, namely R1, R2, and CCITT#5 are utilized and the individual telephone circuits are generally divided into inbounds and outbounds with only minor overlapping. Out of band signaling circuits, which utilize CCITT#6, CCITT#7, and SS7 protocols, however, include protocol transmission circuits that are separate from the telephone circuits. As such, the more advanced signaling protocols enable the individual telephone circuits to be bi-directional. Such out of band circuits are somewhat new and are therefore primarily used by more the advanced PTT's who are often in the reorigination country such as the U.S.

In the preferred embodiment, all of the telephone circuits from the reorigination country will be monitored. In most circumstances the reorigination country will be the United States or another country which is known for telephone call reorigination. Further, the circuit monitoring card will preferably include a dual E-1 card with tone resource and dial tone detection connected in line with the international circuit bundle. Also, in one embodiment, the E-1 card can form part of an open architecture PBX type switch connected with an external computer control. Typically, each of these PBX type switches will include up to 2000 ports, each being able to monitor a given telephone circuit within the international circuit bundle. Similarly, in another embodiment, a card with an integrated monitoring scheme is connected in line with one or more international circuit bundles such that all of the telephone circuits are routed therethrough. As such, the circuit monitoring card is structured and disposed to monitor the international telephone circuits and detect DTMF tones associated with international telephone call reorigination transmitted over connection completed international calls.

In one embodiment of the present invention, wherein in band telephone circuits alone are utilized the monitoring card is structured to decode the signaling protocols for the particular international circuit bundle and thereby identify and monitor inbound telephone circuits versus the outbound circuits. When, however, a more advanced out of band E-1 is also used by the user country, the card must continuously decode the advanced protocols to determine which lines are inbound.

While monitoring only the inbound circuits, the monitoring card is structured to detect outbound DTMF tones transmitted over the inbound telephone circuits on a connection completed international call. In particular, even though DTMF tones are often utilized for legitimate purposes on connection completed international calls, in most instances it is the caller who must make the inquiries or connections by inputting the DTMF tones. Therefore, by detecting outbound DTMF tones sent by a party in the user's country, and transmitted over a call which they received over the inbound international circuits, legitimate calls are substantially eliminated and call back type reorigination calls can be substantially accurately identified for prevention.

In an alternative embodiment, the circuit monitoring card is structured to monitor all telephone circuits in an international circuit bundle. In this embodiment, which may be used independently or in conjunction with the previous embodiment, the circuit monitoring card is structured to listen for a second dial tone on a connection completed international call. In particular, most reorigination services, upon calling back their foreign customer, will merely provide the customer with a new, second dial tone when the reorigination call is answered. This new dial tone is structured to prompt the user to input their destination country code and telephone number along with a PIN or access code number utilizing the DTMF tones or in some rare circumstances an operator. Accordingly, this embodiment is especially useful as new and possible even more advanced signaling protocols are utilized.

In yet another embodiment of the present invention, the circuit monitoring card is structured to identify and detect questionable DTMF tone dialing patterns associated with telephone call reorigination. This embodiment, which can be incorporated independently or in conjunction with one or both of the previous embodiments, may be used as a back up to the previous embodiments so as to provide a secondary check that a connection completed international call is actually a reorigination call. Additionally, however, this embodiment is structured primarily to defeat the final primary characteristic determined to be associated with abusive types of telephone call reorigination, namely the use of ITFS/800 numbers or calling card for reorigination. In this type of reorigination a customer in a foreign country places a call to the reorigination operator using an ITFS/800 number telephone line belonging to the reorigination operator. In this case, the PTT of the customer's country is actually being paid for some service, namely for the ITFS/800 number telephone line purchased by the reorigination operator, however, those ITFS/800 number telephone lines are generally purchased under false pretense and the negotiated price does not accurately reflect the usage. Specifically, some legitimate reorigination carriers do utilize ITFS/800 numbers for telephone call reorigination, such as by providing a calling card to a foreign consumer. Those legitimate and authorized ITFS/800 number telephone lines used for reorigination have, however, been specifically negotiated and paid for in order to ensure that the foreign PTT is appropriately compensated for its loss of international long distance customers. Unfortunately, most reorigination operators do not negotiate for these special ITFS/800 number telephone lines to be used for reorigination. Rather, they purchase the ITFS/800 number telephone line pretending to be a normal company having foreign consumers or foreign facilities and claiming to purchase the circuit for normal party to party telephone traffic rather than for their true purpose which is international telephone call reorigination wherein a large number of customers utilize that same number for purposes of reoriginating international calls and circumventing use of the user country PTT's service. As such, the telephone circuit monitoring card will listen into the telephone circuits and detect questionable DTMF tone dialing patterns initiated upon completed connection of the outbound call. Because in many circumstances, a legitimate outbound call requires the use of further DTMF tones, such as to access voice mail or dial a specific extension, the circuit monitoring card of the present invention is structured so as to detect and identify circumstances wherein the DTMF tone dialing pattern is questionable. For example, in a preferred embodiment, if a transmission of at least seven DTMF tones in a ten second period is detected, that is a very good indication that the DTMF tones are being utilized for a reorigination purpose wherein the user must input a destination telephone number followed by a specific account number and/or access number. Additionally, the monitoring card can be programmed to detect the transmittal of DTMF tones corresponding an international area code followed by a certain number of digits. Accordingly, utilizing the preprogrammed test and monitoring the circuits, DTMF tones associated with telephone call reorigination are detected and identified.

Once a DTMF tone associated with international telephone call reorigination and transmitted over the international telephone circuit is detected, the system, with substantial certainty, identifies the call as a call back made for reorigination purposes, and thereby initiates the functioning of blocking means included in the system. The blocking means, which are preferably integrated with the circuit monitoring card, are structured to selectively prevent completed transmission of the DTMF tones associated with telephone call reorigination over the connection completed international call on the international telephone circuit. Specifically, if any of the DTMF tones associated with telephone call reorigination are detected, either through the monitoring of inbound circuits or if the certain preset pattern or frequency of questionable DTMF tones transmitted out over the telephone circuits are detected, actions will be taken by the blocking means to prevent all of the DTMF tones from being successfully transmitted to the reorigination operator. In the preferred embodiment, because the telephone circuits are routed through the circuit monitoring card, those circuits must merely be opened up to prevent completed transmission. As a result, the call back connection is incomplete and the reorigination operator is not able to fully identify the destination telephone number or the account or code number of the customer. Although the blocking means can merely include filtration means structured to filter out the DTMF tones, such that the telephone call will remain connected, but the DTMF tone will not be audible, in the preferred embodiment the blocking means are structured to completely disconnect the connection completed international call whereon the outbound DTMF tones are detected. The system of the present invention can therefore effectively identify two of the primary characteristics determined to be associated with telephone call reorigination, namely DTMF dialing to transmit account numbers and destination telephone numbers and ITFS/800 number use, and prevent a caller and reorigination operator from effectively using this procedure to complete an abusive international telephone call reorigination. Further, the blocking means may also be structured to disconnect the call or otherwise block transmission of the DTMF tones associated with telephone call reorigination upon the second dial tone being detected by the circuit monitoring card. Along these lines, a user is able to preselect whether one or more of the reorigination conditions, namely DTMF tones transmitted out over an inbound circuit, the detection of questionable DTMF tone dialing patterns, and/or the detection of a second dial tone, must be present prior to disconnecting the call.

As an additional safety, the system of the circuit monitoring card of the present invention is further structured to exclude certain telephone numbers and/or telephone circuits from monitoring and/or disconnection by said blocking means. This is particularly effective if certain numbers are determined to be legitimate numbers whereover DTMF tones that would normally be identified as being associated with telephone call reorigination are transmitted, and if the number and/or telephone circuits belong to legitimate telephone call reoriginators known to the user PTT. These specific numbers and/or circuits are predefined by the user utilizing the system control means and can be supplemented if more legitimate reoriginators are added or if it is determined that a questionable DTMF tone dialing pattern is part of a legitimate use.

Additionally, the system of the present invention includes DID access telephone number detection means. The DID access telephone number detection means are specifically structured and disposed to determine that an international telephone number in the reorigination country is actually a DID access number utilized to initiate an inbound call-back through which a long-distance call is to be reoriginated. Specifically, another primary characteristic generally associated with call-back type long-distance telephone call reorigination involves the use of DID access telephone numbers. The DID access telephone numbers are telephone numbers in the reorigination country which have been assigned to each individual consumer of the reorigination service. The specific consumer when desiring to make a reoriginated long-distance telephone call must merely call their specific designated DID access telephone number, wait for the telephone to ring a predetermined number of times and hang up having received no answer. Through this procedure, commonly known as "uncompensated signaling" and "ring no answer signaling", the consumer utilizes the local PTT's service to place the international telephone call, therefore costing the PTT's money and tying up their telephone circuits so that other legitimate international calls to be serviced by the PTT are delayed or restricted because of the full circuits. In fact, this procedure has become so prevalent and damaging, that the FCC has finally taken steps to make it illegal in the U.S., but only as directed towards countries that have specifically made such calling illegal.

In order to determine that the international telephone number in the reorigination country is actually a DID access telephone number, the DID access telephone number detection means are structured to collect data from a gateway switch in the user's country. The data collected at the gateway switch is specifically directed towards international telephone calls placed to the reorigination country which are never answered. After a predetermined number of the unanswered calls are detected as being made to a specific international telephone number, preferably from the same source, the DID access number detection means will classify that international telephone number as a detected DID access telephone number. In the preferred embodiment, the DID access telephone number detection means includes a computer link with the gateway switch which maintains and/or obtains call records relating to unconnected and therefore unbillable international calls so as to correlate numbers with repeated occurrences. Once an international telephone number has been classified as a detected DID access telephone number, DID access telephone number verification means begin to function. In particular, the DID access telephone number verification means are structured and disposed to place a call to the detected DID telephone number a predetermined number of times to continuously confirm that calls placed to that detected DID access telephone number are truly never answered. Also, not only will the continuous calling to the detected DID access telephone number help to confirm that the number is actually a DID access telephone number, but the calls will also function to tie up the DID access telephone number and effectively restrict and/or hinder the consumer from initiating the abusive call-back reorigination. In this regard, through control means of the system a user is able to specifically set the time, rate and number of confirming calls placed to a detected DID access telephone number. Also, the DID access telephone number verification means are structured to detect an answer to one of the confirmation calls placed to the detected DID access telephone number and therefore unclassify that international telephone number as one of the detected DID access telephone numbers. This unclassification can be automatic and/or include a signal to a user of the system so that they can undertake further checks to determine the classification status of the number in question. Further, although an answer should never occur in circumstances of DID access numbers, for those few occurrences wherein a number of unanswered international calls were placed to a legitimate international telephone number, and because the regulatory agencies of some countries do not permit the placing of caller-less calls, the system of the present invention can also include means to play a legitimate consumer survey or advertisement which conforms with the regulatory guidelines, should an answer be received.

It should be noted that in the preferred embodiment the focus of the system is primarily directed towards the telecommunication channels between the user country and a known reorigination country such as the United States. If, however, necessary, such as due to circumvention tactics by the reorigination operators utilizing call to, from or through countries that are not preventing reorigination, the scope of monitoring can be expanded to include further suspected countries or in fact all international circuits.

The system of the present invention is preferably utilized as part of an overall method of systematically and effectively restricting and substantially preventing abusive long-distance telephone call reorigination. In particular, the method of the present invention is broken up into three primary phases which can be preformed simultaneously, or independently in any order. The first of these methods involves a method of restricting and substantially preventing abusive international long-distance telephone call reorigination that utilizes DTMF dialing whether through call back or ITFS/800 number use. Because there are some legitimate types of DTMF tones utilized in various international calls, the method of the present invention begins first by monitoring international telephone circuits, and especially those telephone circuits coming from a known reorigination country. Next, DTMF tones associated with international telephone call reorigination and transmitted over the inbound telephone circuit on a connection completed international call are detected, and thereby identified. Finally, completed transmission of those DTMF tones associated with telephone call reorigination over the international telephone circuit is blocked, thereby ensuring that a reorigination customer that has just received a call back cannot send out the necessary tones to complete the reorigination.

In a further embodiment, this method can also include the step of monitoring all inbound international telephone circuits in order to detect any outbound DTMF tones, and/or detecting and identifying questionable DTMF tone dialing patters which have been associated telephone call reorigination. Further, because there are some legitimate, yet questionable DTMF tone patterns and some legitimate reoriginators, an additional step of excluding certain telephone circuits and/or lines from being blocked may also be included.

Also preferably included as part of the overall method of systematically and effectively restricting and substantially preventing abusive long-distance telephone call reorigination is the step of detecting the transmittal of a second dial tone, a feature often associated with telephone call reorigination. Once detected, the blocking means can either immediately drop the call or wait for a back up verification utilizing one of the previously recited methods.

In either circumstance, the step of blocking the completed transmission of the DTMF tones associated with telephone call reorigination will preferably include dropping the international call over which the DTMF tone codes having the questionable DTMF tone dialing patterns are being transmitted. Alternatively, the step of blocking completed transmission can include filtering out the DTMF tone codes to prevent their completed transmission.

The overall method of the present invention also includes a method restricting and substantially preventing abusive international long-distance telephone call reorigination that utilizes a DID access number call request. This particular method incorporates the first step of collecting data from a gateway switch in the user's country, said data relating to international telephone calls directed to a telephone number in an identified reorigination country which are never answered. Once a predetermined number of unanswered calls are made to a specific international telephone number, that international telephone number is classified as a detected DID access telephone number. Subsequently, the detected DID access telephone number is called a predetermined number of times to continuously confirm that calls placed to the detected DID access telephone number are never answered, thereby confirming that the detected DID access telephone number is actually a DID access telephone number. If, however, one of the calls placed to the detected DID access telephone number is answered, the steps of playing an appropriate recorded or computerized survey or advertisement and unclassifying that number as a DID access number are also performed.

The system and method of the present invention are specifically designed to be used by individual foreign country PTTs so as to initiate and effectively carry out a plan of attack to substantially eliminate and/or restrict the various abusive methods of telephone call reorigination which used the PTT's services and tie up their various international lines in an abusive and unauthorized manner. As such, in order to help the foreign PTT's better target the reorigination, a results database for various types of data storage is preferably included. Accordingly, a user is able to correlate the information provided by the three main areas of attack of the system to obtain a substantial degree of protection without a great risk of hindering legitimate international telephone traffic along these lines. In the preferred embodiment, one specific application of the results data base services to identify which reorigination countries' carriers are primarily responsible for high volumes of reorigination. These abusive carriers can then be dealt with on an economic level to encourage some voluntary restriction of reorigination using their circuits.

Also, the system of the present invention will preferably include an application host at the switching station of the foreign PTT and a remote access host that can be utilized either for maintenance and operation by the PTTs themselves or for updating and maintenance by an authorized system support service.

Further, the present system will preferably be connected in line with the international telephone circuits between the echo canceling equipment leading from the international carrier network, and the standard E-1 switching equipment of the foreign PTT.

While this invention has been shown and described in what is considered to be a practical and preferred embodiment, it is recognized that departures may be made within the spirit and scope of this invention which should, therefore, not be limited except as set forth in the claims which follow and within the doctrine of equivalents.

Now that the present invention has been described, What is claimed:

1. To restrict and substantially prevent abusive international long distance telephone call reorigination, an integrated international telephone circuit monitoring system comprising:

at least one circuit monitoring card disposed on a telephone circuit from a reorigination country into a monitoring system user's country, said circuit monitoring card being structured and disposed to monitor the telephone circuits of an international circuit bundle and identify and detect DTMF tones associated with telephone call reorigination transmitted over the telephone circuits on a connection completed international call, and blocking means structured to selectively prevent completed transmittal of the DTMF tones associated with telephone call reorigination over the connection completed international call as detected by said circuit monitoring card.

2. An integrated international telephone circuit monitoring system as recited in claim 1 wherein said blocking means are structured to disconnect the connection completed international call whereon said DTMF tones associated with telephone call reorigination are detected by said circuit monitoring card.

3. An integrated international telephone circuit monitoring system as recited in claim 1 wherein said circuit monitoring card is structured to detect a second dial tone on one of said connection completed international call and thereby designate said international call as a reorigination call completion of which is to be blocked by said blocking means.

4. An integrated international telephone circuit monitoring system as recited in claim 1 wherein said circuit monitoring card is connected in line with an in band international circuit bundle and is structured to identify and detect outbound DTMF tones transmitted over an inbound telephone circuit of a connection completed international call, thereby identifying said outbound DTMF tones as said DTMF tones associated with telephone call reorigination.

5. An integrated international telephone circuit monitoring system as recited in claim 4 including at least two of said circuit monitoring cards, one of said circuit monitoring cards being connected in line with an out of band international circuit bundle and being structured to identify said DTMF tones associated with telephone call reorigination by detecting a predetermined questionable DTMF tone dialing pattern transmitted over the telephone circuits of said out of band international circuit bundle.

6. An integrated international telephone circuit monitoring system as recited in claim 4 including at least two of said circuit monitoring cards, one of said circuit monitoring cards being connected in line with said international circuit bundle and being structured to identify said DTMF tones associated with telephone call reorigination by detecting a predetermined questionable DTMF tone dialing pattern transmitted over the telephone circuits of said international circuit bundle.

7. An integrated international telephone circuit monitoring system as recited in claim 1 wherein said circuit monitoring card is connected in line with an out of band international circuit bundle and is structured to identify said DTMF tones associated with telephone call reorigination by detecting a predetermined questionable DTMF tone dialing pattern transmitted over the telephone circuits of said out of band international circuit bundle.

8. An integrated international telephone circuit monitoring system as recited in claim 1 wherein said circuit monitoring card is connected in line with said international circuit bundle and is structured to identify said DTMF tones associated with telephone call reorigination by detecting a predetermined questionable DTMF tone dialing pattern transmitted over the telephone circuits of said international circuit bundle.

9. An integrated international telephone circuit monitoring system as recited in claim 1 wherein said circuit monitoring card is connected in line with the international circuit bundle and is structured to identify and detect outbound DTMF tones transmitted over an inbound telephone circuit of a connection completed international call, thereby identifying said outbound DTMF tones as said DTMF tones associated with telephone call reorigination.

10. An integrated international telephone circuit monitoring system as recited in claim 1 wherein said circuit monitoring card includes a multi port open architecture PBX type switch interfaced with an external computer control.

11. An integrated international telephone circuit monitoring system as recited in claim 1 wherein said circuit monitoring card includes an E-1 card having an integrated monitoring scheme.

12. An integrated international telephone circuit monitoring system as recited in claim 1 wherein said circuit monitoring card is further structured to exclude telephone circuits corresponding authorized telephone call re-originators from being affected by said blocking means.

13. An integrated international telephone circuit monitoring system as recited in claim 1 further including:

DID access telephone number detection means structured and disposed to determine that an international telephone number in the reorigination country is actually a DID access telephone number utilized to initiate an inbound call back through which a long distance call is re-originated, said DID access telephone number detection means being structured to collect data, from a gateway switch in the user's country, relating to international telephone calls directed to the reorigination country which are never answered, said DID access telephone number detection means classifying at least one of the international telephone number in the reorigination country as a detected DID access telephone number upon a predetermined number of un-answered calls being made to the international telephone number, and DID access telephone number verification means structured and disposed to call said detected DID access telephone number a predetermined number of times to continuously confirm that calls placed to said detected DID access telephone number are never answered such that said detected DID access telephone number is actually a DID access telephone number, and to detect an answer to one of said calls to said detected DID access telephone number so as to un-classify the international telephone number as one of said detected DID access telephone numbers.

14. An integrated international telephone circuit monitoring system as recited in claim 13 further including data storage means structured and disposed to store said data collected by said DID access telephone number detection means and data relating to said telephone circuits whereon said DTMF tones associated with telephone call reorigination have been detected.

15. An integrated international telephone circuit monitoring system as recited in claim 13 wherein said DID access telephone number verification means are further structured to play a recorded informational message upon receiving an answer to one of said calls to one of said detected DID access telephone numbers.

16. An integrated international telephone circuit monitoring system as recited in claim 13 wherein said DID access telephone number detection means are further structured and disposed to enable variable setting of said predetermined number of international telephone calls directed to the international telephone number in the reorigination country which are never answered that result in the classification of the international telephone number in the reorigination country as a detected DID access telephone number.

17. An integrated international telephone circuit monitoring system as recited in claim 13 wherein said DID access telephone number verification means are structured and disposed to enable variable setting of the predetermined number of times and a time of day during which said DID access telephone number verification means calls said detected DID access telephone number.

18. An integrated international telephone circuit monitoring system as recited in claim 13 wherein said DID access telephone number detection means are structured to exclude certain authorized numbers from being classified as one of said detected DID access telephone numbers.

19. An integrated international telephone circuit monitoring system as recited in claim 13 wherein said circuit monitoring card is structured to detect a second dial tone on one of said connection completed international call and thereby designate said international call as a reorigination call completion of which is to be blocked by said blocking means.

20. An integrated international telephone circuit monitoring system as recited in claim 1 wherein said blocking means are structured to filter out said DTMF tones associated with telephone call reorigination being transmitted over the telephone circuits on the connection completed international call as detected by said circuit monitoring card.

21. An integrated international telephone circuit monitoring system as recited in claim 5 wherein said predetermined questionable DTMF tone dialing pattern includes a transmission of at least seven DTMF tones in a 10 second period.

22. An integrated international telephone circuit monitoring system as recited in claim 6 wherein said predetermined questionable DTMF tone dialing pattern includes a transmission of at least seven DTMF tones in a 10 second period.

23. An integrated international telephone circuit monitoring system as recited in claim 7 wherein said predetermined questionable DTMF tone dialing pattern includes a transmission of at least seven DTMF tones in a 10 second period.

24. An integrated international telephone circuit monitoring system as recited in claim 8 wherein said predetermined questionable DTMF tone dialing pattern includes a transmission of at least seven DTMF tones in a 10 second period.

25. To restrict and substantially prevent abusive international long distance telephone call reorigination, an integrated international telephone circuit monitoring system comprising:

DID access telephone number detection means structured and disposed to determine that an international telephone number in a reorigination country is actually a DID access telephone number utilized to initiate an inbound call back through which a long distance call is re-originated, said DID access telephone number detection means being structured to collect data, from a gateway switch in a monitoring system user's country, relating to international telephone calls directed to the reorigination country which are never answered, said DID access telephone number detection means classifying at least one of the international telephone number in the reorigination country as a detected DID access telephone number upon a predetermined number of un-answered calls being made to the international telephone number, and DID access telephone number verification means structured and disposed to call said detected DID access telephone number a predetermined number of times to continuously confirm that calls placed to said detected DID access telephone number are never answered such that said detected DID access telephone number is actually a DID access telephone number, and to detect an answer to one of said calls to said detected DID access telephone number so as to un-classify the international telephone number as one of said detected DID access telephone numbers.

26. An integrated international telephone circuit monitoring system as recited in claim 25 further including data storage means structured and disposed to store said data collected by said DID access telephone number detection means and data relating to said telephone circuits whereon said DTMF tones associated with telephone call reorigination have been detected.

27. An integrated international telephone circuit monitoring system as recited in claim 25 wherein said DID access telephone number verification means are further structured to play a recorded informational message upon receiving an answer to one of said calls to one of said detected DID access telephone numbers.

28. An integrated international telephone circuit monitoring system as recited in claim 25 wherein said DID access telephone number detection means are further structured and disposed to enable variable setting of said predetermined number of international telephone calls directed to the international telephone number in the reorigination country which are never answered that result in the classification of the international telephone number in the reorigination country as a detected DID access telephone number.

29. An integrated international telephone circuit monitoring system as recited in claim 25 wherein said DID access telephone number verification means are structured and disposed to enable variable setting of the predetermined number of times and a time of day during which said DID access telephone number verification means calls said detected DID access telephone number.

30. An integrated international telephone circuit monitoring system as recited in claim 25 wherein said DID access telephone number detection means are structured to exclude certain authorized numbers from being classified as one of said detected DID access telephone numbers.

31. An integrated international telephone circuit monitoring system as recited in claim 25 further including at least one circuit monitoring card disposed on at least one telephone circuit from the reorigination country into the user's country, said circuit monitoring card being structured and disposed to monitor the telephone circuits of an international circuit bundle and to detect a second dial tone transmitted over the telephone circuits on a connection completed international call so as to designate said international call as a reorigination call, and blocking means structured to selectively prevent completion of said international call designated as one of said reorigination calls by said circuit monitoring card.

32. To restrict and substantially prevent abusive international long distance telephone call reorigination, an integrated international telephone circuit monitoring system comprising:

at least one circuit monitoring card disposed on a telephone circuit from a reorigination country into a monitoring system user's country, said circuit monitoring card being structured and disposed to monitor the telephone circuits of an international circuit bundle and to detect a second dial tone transmitted over the telephone circuits on a connection completed international call so as to designate said international call as a reorigination call, and blocking means structured to selectively prevent completion of said international call designated as one of said reorigination calls by said circuit monitoring card.

33. A method of restricting and substantially preventing abusive international long distance telephone call reorigination which utilizes DTMF dialing, said method comprising the steps of:

monitoring international telephone circuits, detecting DTMF tones associated with telephone call reorigination transmitted over the telephone circuit on a connection completed international call due to a correlation of said DTMF tones with criteria associated with telephone call reorigination, and blocking completed transmission of said DTMF tones associated with telephone call reorigination transmitted over the telephone circuit.

34. A method of restricting and substantially preventing abusive international long distance telephone call reorigination which utilizes DTMF dialing as recited in claim 33 wherein said step of detecting DTMF tones associated with telephone call reorigination transmitted over the telephone circuit on a connection completed international call includes detecting outbound DTMF tones transmitted over an inbound telephone circuit.

35. A method of restricting and substantially preventing abusive international long distance telephone call reorigination which utilizes DTMF dialing as recited in claim 34 wherein said step of monitoring international telephone circuits includes monitoring international circuits in band circuit bundles.

36. A method of restricting and substantially preventing abusive international long distance telephone call reorigination which utilizes DTMF dialing as recited in claim 34 wherein said step of detecting DTMF tones associated with telephone call reorigination transmitted over the telephone circuit on a connection completed international call includes the step of detecting a predetermined questionable DTMF tone dialing pattern transmitted over the telephone circuits and designating said pattern as being one of said DTMF tones associated with telephone call reorigination.

37. A method of restricting and substantially preventing abusive international long distance telephone call reorigination which utilizes DTMF dialing as recited in claim 36 wherein said step of monitoring international telephone circuits includes monitoring international circuits in out of band circuit bundles.

38. A method of restricting and substantially preventing abusive international long distance telephone call reorigination which utilizes DTMF dialing as recited in claim 33 wherein said step of detecting DTMF tones associated with telephone call reorigination transmitted over the telephone circuit on a connection completed international call includes the step of detecting a predetermined questionable DTMF tone dialing pattern transmitted over the telephone circuits and designating said pattern as being one of said DTMF tones associated with telephone call reorigination.

39. A method of restricting and substantially preventing abusive international long distance telephone call reorigination which utilizes DTMF dialing as recited in claim 33 wherein said step of monitoring international telephone circuits includes monitoring international circuits in out of band circuit bundles.

40. A method of restricting and substantially preventing abusive international long distance telephone call reorigination as recited in claim 33 wherein said step of blocking completed transmission of said DTMF tones associated with telephone call reorigination further includes dropping the international call over which the DTMF tones associated with telephone call reorigination are being transmitted.

41. A method of restricting and substantially preventing abusive international long distance telephone call reorigination as recited in claim 33 further including the step of excluding telephone circuits corresponding authorized telephone call reoriginators from being affected by said blocking means.

42. A method of restricting and substantially preventing abusive international long distance telephone call reorigination as recited in claim 33 further including the steps of:

collecting data from a gateway switch in a user's country relating to international telephone calls directed to a reorigination country which are never answered, classifying an international telephone number in the reorigination country as a detected DID access telephone number upon a predetermined number of un-answered calls being made to the international telephone number, and calling said detected DID access telephone number a predetermined number of times to continuously confirm that calls placed to said detected DID access telephone number are never answered such that said detected DID access telephone number is actually a DID access telephone number.

43. A method of restricting and substantially preventing abusive international long distance telephone call reorigination as recited in claim 33 further including the steps of:

detecting a second dial tone on one of said connection completed international calls designating said international call whereover said second dial tone is being transmitted as a reorigination call, and blocking completed transmission of said reorigination call.

44. A method of restricting and substantially preventing abusive international long distance telephone call reorigination which utilizes DID call requests, said method comprising the steps of:

collecting data from a gateway switch in a telephone call reorigination restriction and prevention method user's country relating to international telephone calls directed to a reorigination country which are never answered, classifying an international telephone number in the reorigination country as a detected DID access telephone number upon a predetermined number of un-answered calls being made to the international telephone number, and calling said detected DID access telephone number a predetermined number of times to continuously confirm that calls placed to said detected DID access telephone number are never answered such that said detected DID access telephone number is actually a DID access telephone number.

45. A method of restricting and substantially preventing abusive international long distance telephone call reorigination as recited in claim 44 further including the steps of:

monitoring international telephone circuits, detecting a second dial tone on a connection completed international call on said international telephone circuits, designating said international call whereover said second dial tone is being transmitted as a reorigination call, and blocking completed transmission of said reorigination call.

46. A method of restricting and substantially preventing abusive international long distance telephone call reorigination, said method comprising the steps of:

monitoring international telephone circuits, detecting a second dial tone on a connection completed international call on said international telephone circuits, selectively designating said international call whereover said second dial tone is being transmitted as a reorigination call, and blocking completed transmission of said reorigination call.

* * * * *